3,165,528
NEW AZAFLUORENES
Paul Schmidt, Therwil, and Eduard Schumacher, Kurt Eichenberger, and Max Wilhelm, Basel, Switzerland, assignors to Ciba Corporation, New York, N.Y., a corporation of Delaware
No Drawing. Filed Aug. 21, 1962, Ser. No. 218,444
Claims priority, application Switzerland, Aug. 24, 1961, 9,869/61
4 Claims. (Cl. 260—296)

The present invention provides new 9-hydroxy-9-($\alpha$-nitro-alkyl)-1:8-diazafluorenes.

In the new compounds the diazafluorene radical is preferably unsubstituted; but it may be substituted, for example, by alkyl groups, especially by those containing 1–4 carbon atoms, such as the methyl, ethyl, n- or isopropyl, n-, iso-, secondary or tertiary butyl groups.

The $\alpha$-nitro-alkyl group in the 9-position of the azafluorene radical, preferably contains only 1–7 carbon atoms and is above all the nitromethyl group, but may also, for example, be 1-nitro-ethyl, -n-propyl, -n-butyl, -n-pentyl, -n-hexyl or -n-heptyl or 2-nitro-propyl-(2) or -butyl-(2).

The new compounds possess valuable properties. Above all, they exhibit an anti-bacterial action, especially against tubercular bacilli. Furthermore, they are active against fungi and protozoa, especially against Coccidia and Amoebae. Thus, the new compounds can be used pharmacologically in animals or as medicaments. In veterinary medicine, they are especially suitable for the treatment of Chicken Coccidiosis and of similar infections in rabbits. The compounds referred to at the beginning can also be used as starting materials or intermediates in the manufacture of other valuable substances.

Especially valuable compounds are the 9-hydroxy-9-nitromethyl-1:8-diazafluorenes, but more particularly 9-hydroxy-9-nitromethyl-1:8-diazafluorene.

The compounds are obtained by reacting a 1:8-diazafluorene-9-one with a nitroalkane.

The reaction with the nitroalkanes may be carried out in the presence or absence of diluents and/or catalysts, with cooling, at normal or at a raised temperature, under normal or increased pressure and/or under an inert gas such as nitrogen. As diluent or solvent there may be used the usual organic solvents, for example lower alkanols such as methanol, ethanol, propanol or butanol, lower ethers such as diethyl ether, dioxane or tetrahydrofurane, hydrocarbons such as benzene or toluene or other inert diluents. The nitroalkane may, however, itself act as solvent or diluent. The reaction is advantageously carried out in the presence of an organic base, especially a nitrogenous base. The catalytically acting base is preferably a secondary or tertiary amine, for example a lower alklyamine such as di- or trimethylamine, di- or triethylamine, a lower alkyleneamine, especially piperidine, or other nitrogenous base, for example pyridine or collidine.

The starting materials are either known or, if new, are obtainable by methods in themselves known.

The compounds may be used as medicaments, for example in the form of pharmaceutical preparations comprising the active ingredient in admixture with a pharmaceutically suitable organic or inorganic, solid or liquid excipient which is suitable for enteral or parenteral administration. For making these preparations, there may be used those substances which do not undergo reaction with the new compounds, such being, for example, water, gelatine, lactose, starch, colloidal silicic acid, magnesium stearate, talc, vegetable oils, benzyl alcohols, gums, polyalkylene glycols, cholesterol or other known medicinal excipients. The pharmaceutical preparations may be in the form of tablets or dragees, or in the form of liquids as solutions, suspensions or emulsions. If necessary, they are sterilized and/or comprise assistants such as preserving, stabilizing, wetting or emulsifying agents, salts for regulating the osmotic pressure or buffers. They may also comprise other therapeutically useful substances. The prepartions are made by the usual methods known in the art.

The new compounds can preferably be used as additives to animal feedstuffs, especially for rearing and keeping poultry or rabbits. The invention therefore also concerns the animal feedstuffs or additives to animal feedstuffs which contain the new compounds in admixture with the customary extenders or diluents.

The composition of the feedstuffs or feedstuff additives, to which the above described compounds are added, depends on the kind of animal to be fed, its age, the current market price of the feedstuff concerned and other factors. As a rule, feedstuffs which contain carbohydrates, proteins, fats, minerals and vitamins are very advantageous. Suitable feed components are, for example, corn, such as rye, wheat, barley, oats, buckwheat, maize, sorghum or millet, and their ground products, such as groats, middlings, shorts or meal, grass, clover, alfalfa, cabbage or hay, molasses, meat scrap, fish meal, soybean meal, groundnut meal or oil cake meal, cod liver oil, lime powder or bone meal, thiamine, riboflavin, ascorbic acid or vitamin $B_{12}$ or similar feed, mineral or vitamin supplements. The new compounds may also be given in solution or dispersion with drinking water or skimmed milk, if desired in the presence of a suitable dispersant or in the form of tablets or capsules.

The feedstuffs or feedstuff additives may also contain other valuable ingredients, for example antibiotics with a wide therapeutic range, such as tetracycline or chlorotetracycline, hormones or other compounds with a hormone activity, such as diethylstilbestrol or hexestrol, or other growth-promoting factors, for example alkaloids obtainable from plants of the Apocynaceae family and having a sedative effect, such as reserpine, rescinnamine, deserpidine or raunescine or mother liquors or oleoresins containing these.

The new feedstuffs, particularly the chicken food, contain, for example, 0.001 to 0.1%, preferably 0.005 to 0.01%, of the active ingredient. The chicken feedstuffs may be, for example, in the form of so-called all-feed for chicks or as all-mash for chickens, or in the form of a feed consisting of about two-thirds of grain-mixture and one-third of all-feed for chicks.

Accordingly, the invention also includes a process in which the new compounds are added to the customary animal feedstuffs and a process for rearing and keeping animals, particularly poultry and rabbits, consisting in giving feed or drink containing the above compounds.

The following examples illustrate the invention:

Example 1

1.5 cc. of piperidine is added dropwise to a solution of 5 grams of 1:8-diaza-fluorene-9-one in 20 cc. of nitromethane, and this is then stirred for 15 minutes at 50° C. After cooling, the precipitate is filtered and crystallized from ethanol/petroleum ether. 9-hydroxy-9-nitromethyl-1:8-diazafluorene of the formula

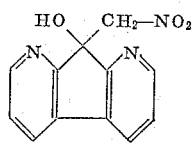

melting at 175° C., is obtained.

Example 2

3 cc. of piperidine are added dropwise to a solution of 10 grams of 1:8-diazafluorene-9-one in 40 cc. of nitroethane with stirring at room temperature. After 1 hour, 25 cc. of ethanol and 25 cc. of petroleum ether are added, and the precipitate is filtered off. The latter is recrystallized from a mixture of chloroform and petroleum ether to yield 9-hydroxy-9-(α-nitroethyl)-1:8-diazafluorene of the formula

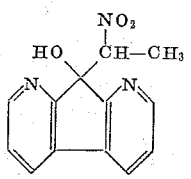

in the form of crystals melting at 155° C.

Example 3

3 cc. of piperidine are added dropwise to a solution of 10 grams of 1:8-diazafluorene-9-one in 35 cc. of 1-nitropropane with stirring at room temperature. The whole is then heated for 15 minutes at 50° C. A precipitate settles out which is filtered off and recrystallized from a mixture of chloroform and petroleum ether to yield 9-hydroxy-9-(α-nitropropyl)-1:8-diazafluorene of the formula

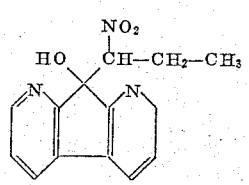

in the form of crystals melting at 165° C.

Example 4

Feedstuff composition—

| Premix: | Grams |
|---|---|
| 9 - hydroxy - 9 - nitromethyl - 1:8 - diazafluorene | 1.0 |
| Wheat standard middlings | 7999.0 |
| Total | 8000.0 |

| Mixture to be added: | Grams |
|---|---|
| Maize flour | 1089.9 |
| Fat | 80.0 |
| Fishmeal (60% protein) | 100.0 |
| Soybean meal (50% protein) | 500.0 |
| Maize gluten | 100.0 |
| Lucerne meal | 50.0 |
| Corn distillers' solubles | 40.0 |
| Calcium carbonate | 28.0 |
| Iodized salt | 10.0 |
| Vitamin A and of the D group (1,000,000 units of A and 250,000 units of D per pound) | 4.0 |
| Calcium pantothenate | 0.25 |
| Butyl-hydroxytoluene | 0.25 |
| Choline chloride of 25% strength | 2.5 |
| Riboflavin (24 grams per pound) | 0.1 |
| Vitamin $B_{12}$ (0.02 gram per pound) | 1.0 |
| Methionine | 0.5 |
| Manganese sulphate | 0.5 |
| Total | 2000.0 |

The mixture to be added is prepared as follows: About half of the maize flour is put into the mixer, the remainder, to which the heated, liquefied fat has been added, is then added and the whole is mixed until the fat is evenly distributed. While mixing, the manganese sulfate, calcium carbonate and iodized salt are then added, followed by the fish meal soy bean meal, alfalfa and maize gluten and the Corn Distillers' solubles. After mixing thoroughly, the vitamins A and D, the calcium pantothenate, choline chloride, riboflavin vitamin $B_{12}$, methionine and butyl-hydroxytoluene are added. The thoroughly mixed premix is then added and mixing is continued until all the ingredients are evenly distributed.

Example 5

| Feedstuff additive: | Grams |
|---|---|
| 9-hydroxy-9-nitromethyl-1:8-diazafluorene | 100 |
| Carbo medicinalis | 15 |
| Cerelose to make | 1000 |

The well mixed feedstuff additive is added to the feed in an amount to give a concentration of about 0.01% of active substance in the uniformly blended mix.

Example 6

| | Mg. |
|---|---|
| 9-hydroxy-9-nitromethyl-1:8-diazafluorene | 500.0 |
| Starch | 31.0 |
| Colloidal silicic acid | 30.0 |
| Gelatine | 5.0 |
| Arrowroot | 35.0 |
| Magnesium stearate | 4.0 |
| Talc | 20.0 |
| Total | 625.0 |

Grooved tablets are prepared in the conventional manner with the above ingredients weighing 625 mg.

What is claimed is:

1. A member selected from the group consisting of (1) 9-hydroxy-9-(α-nitro-lower alkyl)-1:8-diazafluorene and (2) 9-hydroxy-9-(α-nitro-lower alkyl)-1:8-(R)-diazafluorene, in which R is lower alkyl having 1 to 4 carbon atoms.

2. 9-hydroxy-9-(α-nitroethyl)-1:8-diazafluorene.

3. 9-hydroxy-9-(α-nitropropyl)-1:8-diazafluorene.

4. 9-hydroxy-9-nitromethyl-1:8-diazafluorene.

No references cited.